United States Patent [19]

Sutton

[11] Patent Number: 4,923,393
[45] Date of Patent: May 8, 1990

[54] FUEL FIRED BURNER

[75] Inventor: David M. Sutton, Camberley, England

[73] Assignee: British Gas Corporation, London, England

[21] Appl. No.: 883,502

[22] Filed: Jul. 8, 1986

[51] Int. Cl.$^5$ .............................................. F23D 14/12
[52] U.S. Cl. .................................. 431/328; 431/178; 239/568
[58] Field of Search ............... 431/178, 179, 174, 170, 431/328; 432/175, 192; 239/568

[56] References Cited

U.S. PATENT DOCUMENTS

| 1,830,393 | 11/1931 | Geurink et al. ..................... 239/568 |
| 3,131,752 | 5/1964 | Blanzy . | |

FOREIGN PATENT DOCUMENTS

| 3802268 | 12/1970 | Australia . |
| 009831 | 4/1980 | European Pat. Off. . |
| 085470 | 2/1983 | European Pat. Off. . |
| 130742 | 6/1984 | European Pat. Off. . |
| 627024 | 3/1936 | Fed. Rep. of Germany . |
| 1626001 | 9/1969 | Fed. Rep. of Germany ...... 239/568 |
| 2481415 | 4/1980 | France . |
| 541317 | 4/1942 | United Kingdom . |
| 1103073 | 3/1965 | United Kingdom . |
| 1135140 | 11/1967 | United Kingdom . |
| 1224443 | 4/1969 | United Kingdom . |
| 1265759 | 6/1969 | United Kingdom . |
| 1579829 | 5/1976 | United Kingdom . |
| 2076956 | 12/1981 | United Kingdom . |

Primary Examiner—Carroll B. Dority
Attorney, Agent, or Firm—Oblon, Spivak, McClelland, Maier & Neustadt

[57] ABSTRACT

A fuel-fired burner of the gas-fired fully premixed type comprises a plenum chamber 2 formed by walls 5, 7, 8, 9, 10 and 11, the wall 11 having an inlet port 4 to enable the plenum chamber 2 to receive a mixture of gas and air from a mixing chamber 3 and the wall 5 comprising a plate having therein several through-going rectangular slots 6 which communicate with the chamber 2. The mixing chamber 3 has an inlet end 15 for connection to a source of pressurized air and a further inlet opening 17 in a wall 13 formed with a stub pipe 18 by means of which the chamber 3 can be connected to a source of fuel gas.

8 Claims, 5 Drawing Sheets

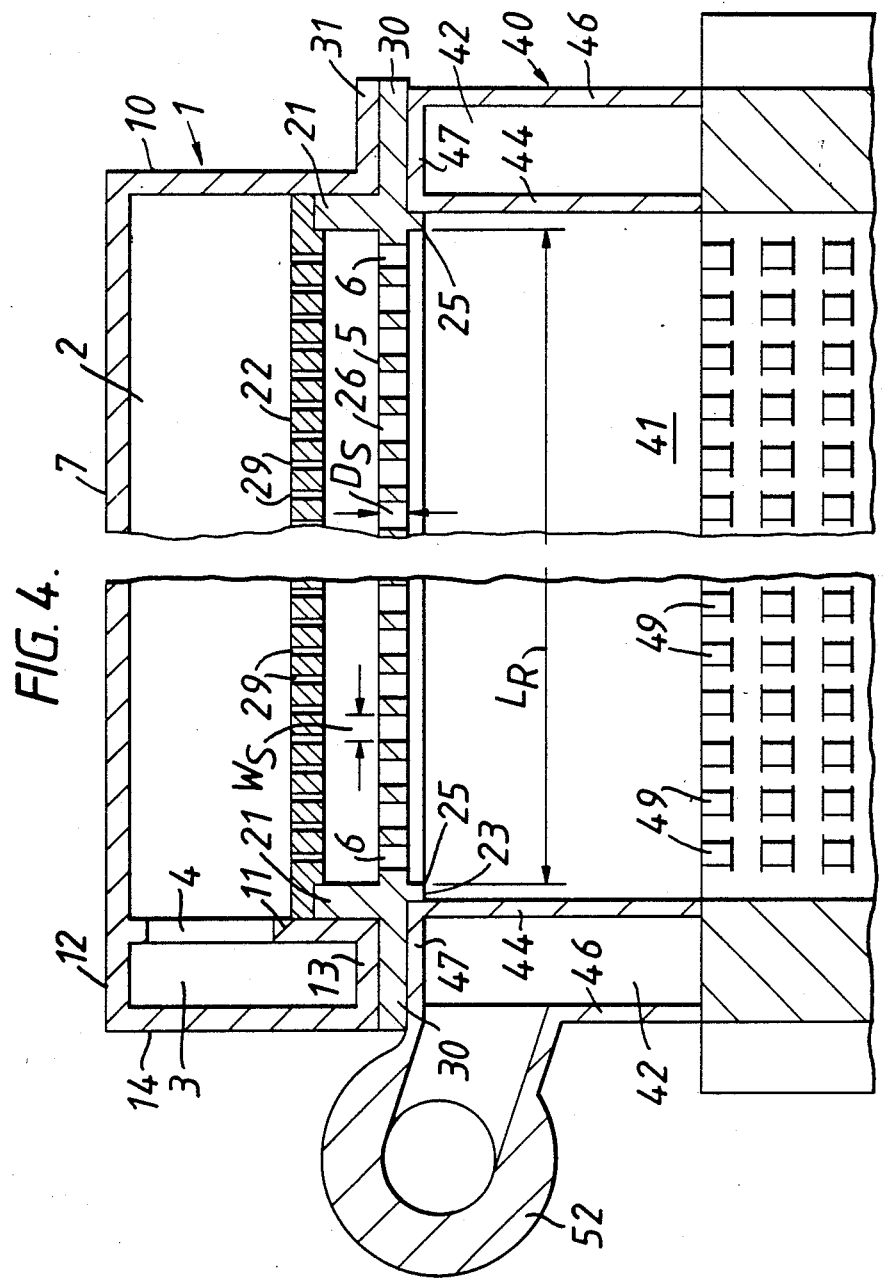

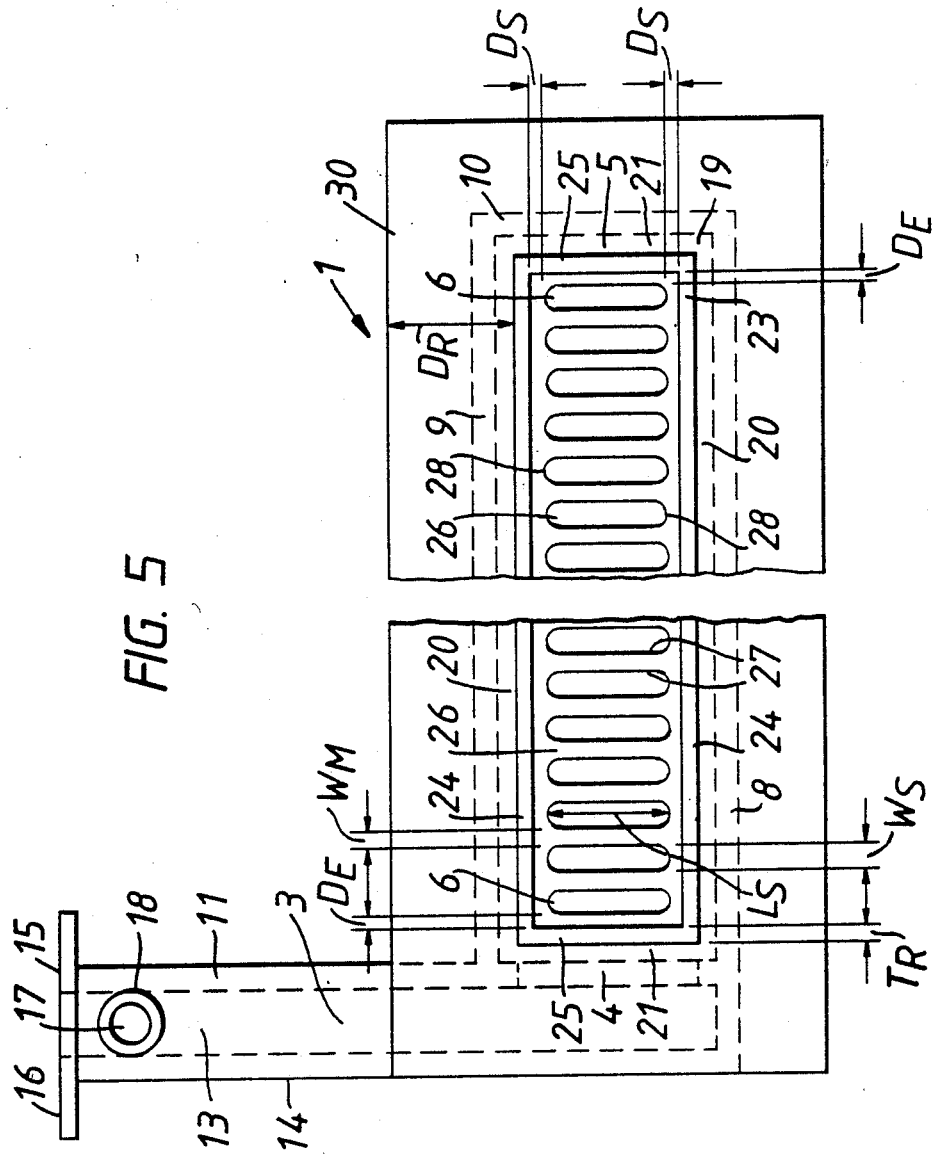

FUEL FIRED BURNER

BACKGROUND OF THE INVENTION

The present invention relates to a fuel fired burner, and particularly a gas fired burner, which preferably is of the fully premixed type ie. one in which the gas is mixed with all the combustion air in the mixing chamber before the gas is combusted.

Fully premixed burners have certain advantages over partially aerated type burners (ie. burners of the type in which only some of the combustion air is mixed with the gas before the gas is admitted to the combustion chamber.)

Firstly, the flames emitted from a fully premixed burner are shorter than those emitted from a partially aerated burner.

Secondly, it is possible to operate a fully premixed burner with a lower excess air level than is necessary with a partially aerated burner at the same gas input rate.

Thirdly, fully premixed burners can be arranged to fire the flame downwardly whereas partially aerated burners are generally unsuitable for such operation.

Taken together these characteristics means that fully premixed burners are ideal for use in boilers of the condensing type, since:

(i) the first and second characteristics enable the space required for mixing air and gas, and for combustion, to be minimised, thereby leaving a maximum of space for the heat exchanger within a given overall size of appliance casing. (Condensate type heat exchangers are inherently larger than non-condensing type heat exchangers of equivalent heat output).

(ii) the third characteristic permits the use of a simple system for condensate collection.

Both fully premixed and partially aerated burners can be operated over a range of gas flow rates ie. burner heat outputs. This range is defined as the turndown ratio which comprises the ratio of the maximum/-minimum flow rates available for combustion. This ability is a great advantage in certain type of applications, for example, where the burner is to be used in a central heating boiler in order to maximise efficiency and to increase reliability of operation.

In partially aerated burners this ratio lies between 10 and 15:1 but in the types of fully premixed burner currently available for small gas appliances it is limited to no more than 2:1. This is because when the current types of premixed burner are operated at ratios of greater than 2:1 certain undesirable effects begin to appear.

Firstly, the phenomenon of "flame lift" begins to occur. In this case, the flame partially or completely detaches itself from the burner outlet ports and becomes very unstable, giving rise to poor combustion and/or burner shut down by the safety device which monitors the flame.

Secondly, the surfaces surrounding the ports may overheat and can become damaged, or can cause the flame to propagate back through the ports into the burner with disastrous results.

Thirdly, there is a tendency for the burner noise to rise to unacceptably high levels.

SUMMARY OF THE INVENTION

It is therefore an object of the present invention to provide a burner in which the turndown ratio can be increased beyond 2:1 while at the same time the effect of the above mentioned phenomena is retained at an acceptable level.

According to the present invention, there is provided a fuel fired burner comprising a plenum chamber formed by walls, one of which has an inlet to receive fuel and another of which is formed with at least one slot communicating with the chamber and serving as an outlet for the fuel.

BRIEF DESCRIPTION OF THE DRAWINGS

An embodiment of the invention will now be particularly described with reference to the accompanying drawings in which:

FIG. 4 is a view along the lines IV—IV of FIG. 3.

FIG. 5 corresponds to FIG. 2 but shows a variant of the slot shape.

DETAILED DESCRIPTION OF THE PREFERRED EMBODIMENTS

Figure 1:
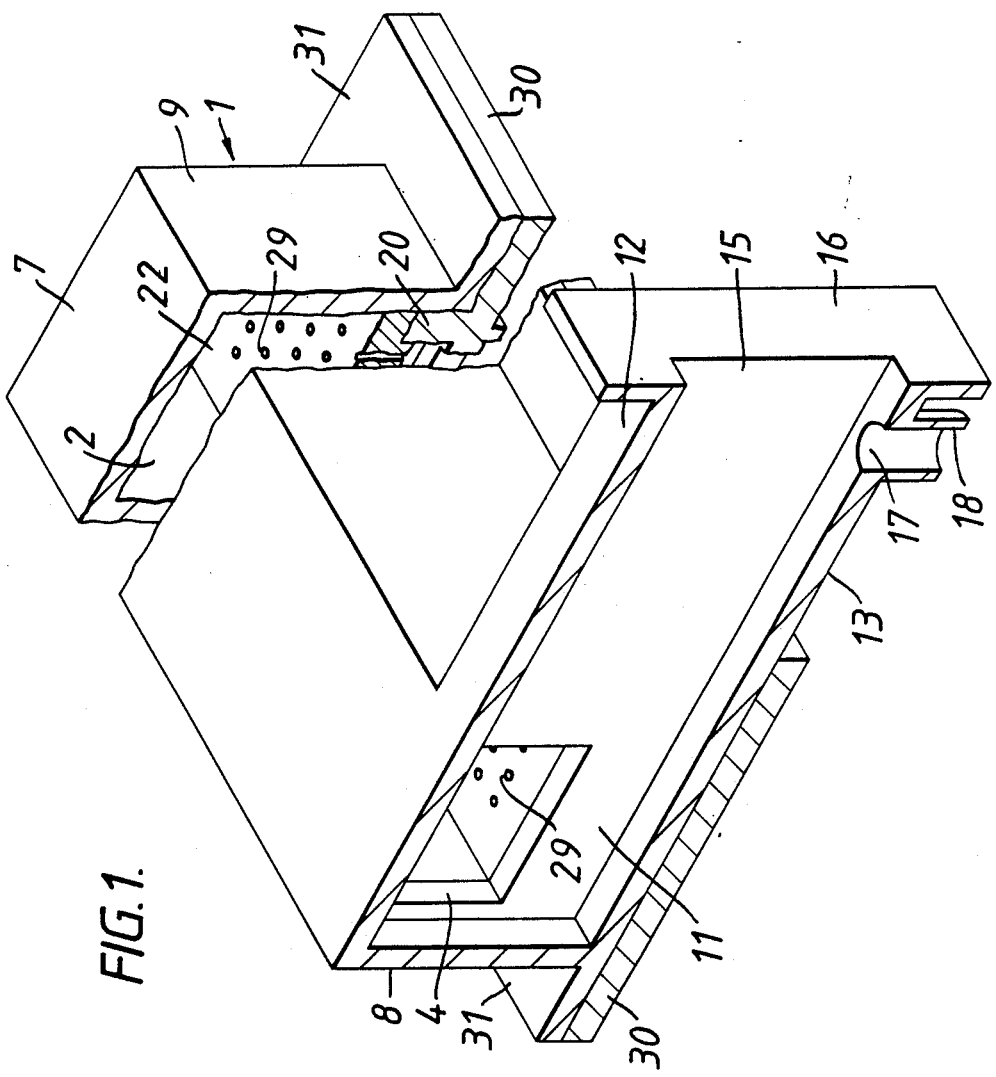
FIG. 1 is a view of the burner shown partly broken away for clarity.
Figure 2:
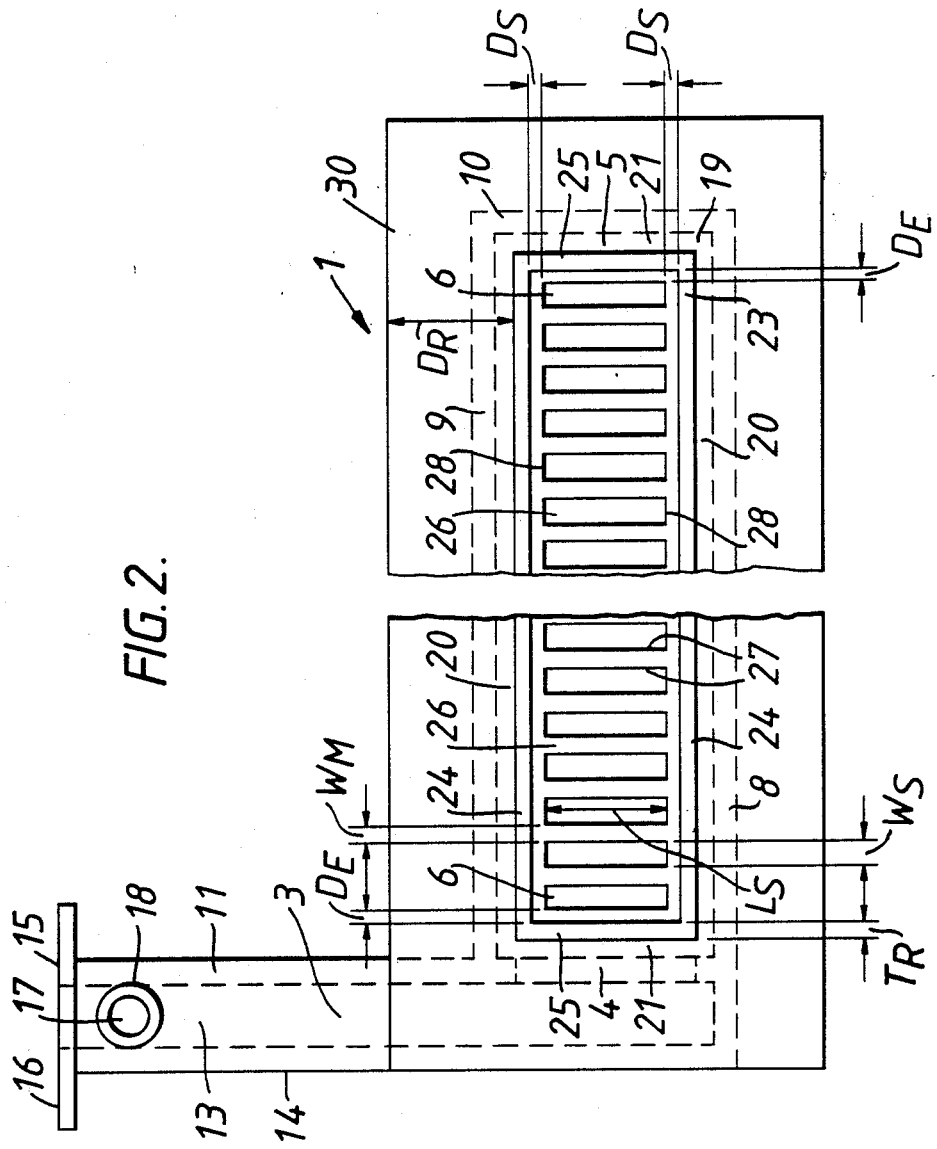
FIG. 2 is view looking on the lower face, from below, of the burner shown in FIG. 1.
Figure 3:
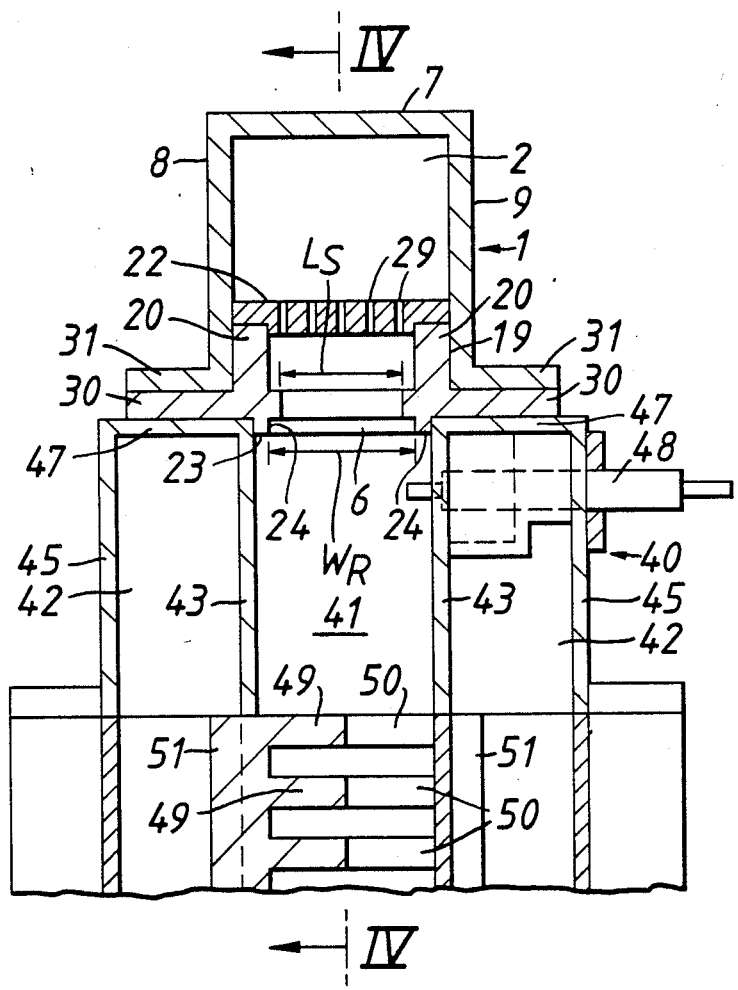
FIG. 3 is a transverse section through the burner shown mounted on a heat exchanger of a gas fired boiler.

Referring to the FIGS. 1 to 3 in particular, the burner 1 shown in a downfiring mode in FIGS. 1, 3 and 4 comprises an elongated plenum chamber 2 having adjoining one end a mixing chamber 3 for supplying a mixture of fuel gas and air to the plenum chamber 2 by way of an inlet 4, one wall of the chamber 2 comprising a plate 5 provided with several slots 6 serving as outlets for the gas/air mixture for subsequent ignition at a point outside the plenum chamber 2.

Apart from the previously mentioned plate 5 forming a lowermost horizontal wall to the plenum chamber 2, the chamber 2 is also formed by an uppermost horizontal wall 7, two vertical side walls 8,9, a vertical end wall 10 and opposite the wall 10 a further vertical end wall 11 which forms a common part of the mixing chamber 3 and includes the inlet 4 by means of which the plenum chamber 2 and the mixing chamber 3 communicate.

The mixing chamber 3 is formed by an uppermost horizontal wall 12 which adjoins the uppermost wall 7 of the plenum chamber 2, a lowermost horizontal wall 13, a vertical side wall 14, a vertical side wall 11 (including a part common to the plenum chamber 2) and an end wall forming part of the wall 8 of the plenum chamber 2.

As shown in FIGS. 2 and 4 the mixing chamber 3 lies adjacent to one end of the plenum chamber 2 and extends at right angles away therefrom.

The far end 15 of the mixing chamber 3 (see FIGS. 1 and 2) is open and is surrounded by a flange 16 for connecting the chamber 3 to a suitable source of pressurised air. The lowermost wall 13 of the chamber 3 is provided with an inlet opening 17 and a stub pipe 18 by means of which the mixing chamber 3 can be connected to a suitable source of fuel gas.

The plate 5 is generally rectangular in shape as will be clear from FIG. 2 and is formed with an upstanding rectangular rim 19 (shown in outline in FIG. 2) having two side walls 20 and two end walls 21, upon which rim 19 is seated a further rectangular plate 22 (shown most clearly in FIGS. 3 and 4) for purposes to be described.

The plate 5 is also provided with a depending rectangular rim 23 disposed generally opposite to the rim 19, the rim 23 having two side walls 24 and two end walls 25. This rim 23 serves as a flame stabiliser as will be further described subsequently.

Extending through that section 26 (FIG. 2) of the plate 5 lying between the rims 19 and 23 are several through-going slots 6. The slots 6 are generally rectangular in shape preferably oblong as shown but they could be square-shaped and are formed by two longer walls 27 extending parallel to the end walls of the rims 21 and 23 and two shorter walls 28 extending generally parallel to the side walls of the rims 21 and 23 as shown most clearly in FIG. 2. As shown in FIG. 5, the shorter walls 28 may advantageously be concavely curved. This arrangement reduces the incidence of hot-spots occurring at corners which are absent in this arrangement. The slots 6 serve as outlets for the fuel gas/air mixture leaving the plenum chamber 2.

As previously mentioned there is mounted upon the rim 19 within the plenum chamber 2 a further rectangular plate 22 (FIGS. 1, 3 and 4). This is provided with a multiplicity of through-going apertures 29 which may be circular. The plate 22 serves to distribute the fuel gas/air mixture to the slotted plate 5.

The plate 5 is provided with an outwardly extending flange 30 forming a border around the rims 19 and 23. This enables the plate 5 to be attached to a similar flange 31 (extending at right angles outwardly from the walls 8,9 and 10 of the plenum chamber 2) as well as to the bottom wall 13 of the mixing chamber 3.

In use, fuel gas is supplied to the mixing chamber 3 by way of the inlet 17 and air is supplied by way of the inlet 15. After mixing in the chamber 3 the mixture enters the plenum chamber 2 by way of the inlet 4 and emerges from the burner 1 by way of the plates 22 and 5.

Ignition of the gas/air mixture takes place after the mixture has emerged from the slots 6 in the plate 5. Such ignition may be effected by ignition electrodes.

The burner 1 is suitable for use in a gas-fired boiler particularly a boiler of the condensing type. The burner 1 may be mounted to fire downwardly into the heat exchanger as shown in FIGS. 3 and 4.

In these figures, the upper part of a suitable heat exchanger 40 is shown. The heat exchanger 40, which may be of aluminium, comprises a central open ended duct 41 extending vertically, into which duct 41 the burner 1 fires in a downward direction and an outer surrounding chamber 42 through which water circulates in an upward direction.

The central duct 41 is rectangular in section and comprises two elongated vertical side walls 43, and two vertical end walls 44 extending at right angles to the side walls 43.

The outer chamber 42 is formed by the space enclosed between the inner walls 43 and 44 (also common to the central duct 41) and two outer elongated vertical side walls 45, two outer vertical end walls 46, a horizontal top wall 47 connecting the inner and outer walls and a horizontal bottom wall (not shown).

The burner 1 is mounted over the opening at the upper end of the central duct 44, with the plate flange 30 engaging the top wall 47 of the heat exchanger 40 by way of a gasket (not shown). The burner plate 5 is dimensioned so that its depending rim 23 fits within the opening adjacent to the inner walls of the heat exchanger 40.

As seen in FIG. 3, extending through one pair of side walls 43 and 45 of the heat exchanber 40 is a pair of spark ignition electrodes 48 (only one shown) to provide sparks serving to ignite fuel gas leaving the burner outlet slots 6. A further electrode (not shown) extending through one pair of the side walls 43 and 45 of the heat exchanger 40 is positioned to detect the presence or absence of a flame from the burner 1.

Extending inwardly into the central duct 41 from each of the inner side walls 43 are a multiplicity of equispaced fin elements 49 and 50 serving to promote turbulent flow of the combusted gas along the duct 41 to increase the degree of heat transfer of the gas across the inner walls 43 and 44 of the duct 41 to the water in the outer chamber 42.

The fin elements 49 and 50 are arranged in horizontal and vertical rows and as shown in FIG. 4. The fins are arranged so that the horizontal rows on opposite walls lie in the same plane but the vertical rows lie in offset planes.

While not shown in detail, there are several equispaced vertically directed fin elements 51 extending inwardly into the outer chamber 42 from the inner walls 43 and over a large portion of the vertical extent of each of the walls 43. Adjacent fin elements 51 form channels in which the water can flow to promote greater heat transfer. The inner end walls 44 may be provided with similar equispaced fin elements 51.

One of the chamber outer walls 46 may be provided with a water inlet (not shown) which is located at a point adjacent the bottom of the heat exchanger 40 and which serves to receive cooler water for heating and a water outlet 52 (FIG. 4) to discharge the now heated water from the chamber 42.

The efficiency of the burner 1 is maximised by designing the slotted plate 5 in accordance with the following parameters;

Slot Depth $\geq 2 \times$ Slot Width ($W_S$);

Slot Length ($L_S$) $\geq W_S$ and preferably $\geq 2 \times W_S$.

Separation between slots, ie. land width ($W_M$) = 1.0–2.5 mm preferably 1.2–2.5 mm.

A typical slotted burner plate 5 has the following dimensions:

Slot depth = 3 mm
$W_s$ = 0.9 mm
$L_S$ = 25 mm
$W_M$ = 1.25 mm
Total number of slots = 88

Distance between opposed faces of end walls 25 of rim 23 ($L_R$) = 186 mm;

Distance between opposed faces of side walls 24 of rim 23 ($W_R$) = 27 mm;

Distance between the outside face of the rim 23 and outside edge of flange 30 ($D_R$) = 15 mm;

Distance between the inside faces of the rim end walls 25 and the adjoining slot ($D_E$) = 1.2 mm;

Distance between the inside faces of the rim side walls 24 and the ends of slots ($D_S$) = 1 mm.

We have found that it is possible to operate a burner of the type described with a turndown ratio of at least ;b 6:1 and with significant reductions in the phenomena of flame lift, burner overheating and operating noise.

I claim:

1. A fuel fired burner comprising:
a plenum chamber having first and second walls;
means for supplying said plenum chamber with a fully premixed air-fuel mixture via said first plenum wall; and a plurality of substantially rectangular slots through said second plenum wall for permitting discharge of said air-fuel mixture, said slots being separated by lands having a width Wm, wherein said plurality of slots form an elongate array and each of said slots has a width Ws in the direction of elongation of said array and a length Ls transverse to the direction of elongation of said array, wherein:

$$L_s \geqq W_s$$

and the through-wall depth of each slot is at least equal to twice the width of the slot.

2. The burner of claim 1 wherein:

$$L_s \geqq 2 \times W_s.$$

3. The burner of claim 1 wherein said second wall has a peripheral depending rim extending from said second wall on a side thereof opposite said plenum chamber, said depending rim being spaced from said slots, in a direction of the length Ls of said slots, by a distance Ds.

4. The burner of claim 2 wherein Wm = 1.0–2.5 mm.

5. The burner of claim 1 wherein said means for supplying a fully premixed air-fuel mixture comprises a mixing chamber having means for separately receiving air and fuel, and means for communicating said mixing chamber with said first wall.

6. The burner of claim 5 wherein said mixing chamber is external of said plenum chamber.

7. The burner of claim 1 wherein Wm = 1.2–2.5 mm.

8. A burner as claimed in claim 1 in which the ends of each slot are curved.

* * * * *